(12) United States Patent
Kim et al.

(10) Patent No.: US 11,025,306 B2
(45) Date of Patent: Jun. 1, 2021

(54) NODE UNIT AND METHOD OF PROCESSING SIGNAL FOR DISTRIBUTED ANTENNA SYSTEM

(71) Applicant: SOLiD, INC., Seongnam-si (KR)

(72) Inventors: Doyoon Kim, Bucheon-si (KR); Kwangnam Seo, Guri-si (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/540,625

(22) PCT Filed: Dec. 30, 2015

(86) PCT No.: PCT/KR2015/014535
§ 371 (c)(1),
(2) Date: Sep. 1, 2017

(87) PCT Pub. No.: WO2016/108648
PCT Pub. Date: Jul. 7, 2016

(65) Prior Publication Data
US 2017/0359103 A1    Dec. 14, 2017

(30) Foreign Application Priority Data

Dec. 30, 2014   (KR) .................... 10-2014-0194355
Mar. 10, 2015   (KR) .................... 10-2015-0033304

(51) Int. Cl.
*H04B 7/02*          (2018.01)
*H04B 7/022*         (2017.01)
(Continued)

(52) U.S. Cl.
CPC ............ *H04B 7/022* (2013.01); *H04B 7/155* (2013.01); *H04B 10/25753* (2013.01);
(Continued)

(58) Field of Classification Search
CPC ..... H04W 72/04; H04W 40/00; H04W 16/02; H04W 16/04; H04W 88/085; H04B 7/14;
(Continued)

(56) References Cited

U.S. PATENT DOCUMENTS 7,196,650 B1 *   3/2007   Hand ..................... H03H 17/06
                                                    341/141
8,155,520 B1 *   4/2012   West .................. H04Q 11/0066
                                                    398/50
(Continued)

FOREIGN PATENT DOCUMENTS

KR    10-2013 0124604 A    11/2013
KR    10-2014-0026321       3/2014
KR    10-2014-0121551      10/2014

OTHER PUBLICATIONS

International Search Report issued in International Application No. PCT/KR2015/014535 dated May 4, 2016.
(Continued)

*Primary Examiner* — Sophia Vlahos
(74) *Attorney, Agent, or Firm* — Sughrue Mion, PLLC

(57) ABSTRACT

According to an aspect of the inventive concept, there is provided a signal processing method performed in a distributed antenna system, includes extracting at least a part of sample data corresponding to an occupied frequency band from a digitized analog RF signal; and combining the extracted sample data.

11 Claims, 8 Drawing Sheets

(51) Int. Cl.
*H04L 25/03* (2006.01)
*H04L 25/26* (2006.01)
*H04B 7/155* (2006.01)
*H04B 10/2575* (2013.01)
*H04W 88/08* (2009.01)

(52) U.S. Cl.
CPC .............. *H04L 25/03* (2013.01); *H04L 25/26* (2013.01); *H04W 88/085* (2013.01)

(58) Field of Classification Search
CPC .... H04B 7/02; H04B 7/022; H04B 10/25753; H04L 25/03; H04L 25/26
See application file for complete search history.

(56) References Cited

U.S. PATENT DOCUMENTS

| | | | |
|---|---|---|---|
| 2003/0128836 A1* | 7/2003 | Stephens | H04M 1/82 379/399.01 |
| 2006/0215747 A1* | 9/2006 | Pietraski | H03H 21/0043 375/232 |
| 2008/0151984 A1* | 6/2008 | Schmidt | H03H 17/0642 375/230 |
| 2008/0175175 A1 | 7/2008 | Oren et al. | |
| 2008/0232305 A1* | 9/2008 | Oren | H04B 7/022 370/328 |
| 2008/0256421 A1* | 10/2008 | Gerstel | H03M 13/353 714/776 |
| 2009/0067363 A1 | 3/2009 | Ruiz et al. | |
| 2010/0278530 A1* | 11/2010 | Kummetz | H04W 88/085 398/41 |
| 2012/0314797 A1 | 12/2012 | Kummetz et al. | |
| 2013/0066934 A1* | 3/2013 | Edo | H03H 17/0664 708/313 |
| 2014/0314002 A1 | 10/2014 | Hanson et al. | |
| 2015/0373722 A1* | 12/2015 | Lange | H04B 7/026 370/315 |

OTHER PUBLICATIONS

Notice to Submit Response issued in the Korean Patent Office in Application No. 10-2016-7010548 dated Feb. 6, 2017, along with English translation thereof.
Notice to Submit Response dated Aug. 9, 2018 in the European Patent Office in EP Application No. EP 15875742.7.

* cited by examiner

NODE UNIT AND METHOD OF PROCESSING SIGNAL FOR DISTRIBUTED ANTENNA SYSTEM

CROSS-REFERENCE TO RELATED APPLICATIONS

This application is a National Stage of International Application No. PCT/KR2015/014535, filed Dec. 30, 2015, and claims priority from Korean Patent Application No. 10-2014-0194355, filed Dec. 30, 2014, and Korean Patent No. 10-2015-0033304, filed Mar. 10, 2015, the contents of which are incorporated herein by reference in their entireties.

BACKGROUND

1. Field

The inventive concept relates to a node unit of a distributed antenna system and a signal processing method. More particularly, the inventive concept relates to a node unit of a distributed antenna system capable of reducing a transmission capacity of signals, and a signal processing method.

2. Description of the Related Art

In general, a relay device is installed to extend a service coverage of a base station or to remove a shadow region in a mobile communication system. In this case, a distributed antenna system is commercially used as a way to properly accept various needs for installation of the relay device according to an installation region or characteristics of the installation region. Recently, needs for a digital system that performs digital processing on signals, such as a digital distributed antenna system, are increasing.

When the digital distributed antenna system is implemented with a neutral host system so as to support various services of a plurality of service providers (not a particular service provider), in order to guarantee a service quality of each of the service providers, an appropriate transmission capacity has to be secured according to frequency bands of the service providers when signal transmission between node units of the digital distributed antenna system is performed. However, as a transmission resource between the node units is limited, it is difficult to distribute an appropriate transmission capacity according to a frequency band corresponding to each of the service providers and to operate the digital distributed antenna system. Also, as high costs are required to increase the transmission resource itself, a price competitiveness of the digital distributed antenna system is lowered.

Thus, in the digital distributed antenna system implemented as the neutral host system, a reduction in a transmission capacity of signals is required to efficiently operate the digital distributed antenna system even in a state in which the transmission resource is limited, and to secure the price competitiveness.

SUMMARY

The inventive concept is directed to providing a node unit and a signal processing method, whereby a transmission capacity of signals can be reduced.

In addition, the inventive concept is directed to providing a node unit and a signal processing method, whereby costs required to implement a digital distributed antenna system can be reduced.

Furthermore, the inventive concept is also directed to providing a node unit and a signal processing method, whereby a waste of resources of a digital distributed antenna system can be reduced.

According to an aspect of the inventive concept, there is provided a signal processing method performed in a node unit of a distributed antenna system, includes extracting at least a part of sample data corresponding to an occupied frequency band from a digitized analog radio frequency (RF) signal; and combining the extracted sample data.

According to an exemplary embodiment, the signal processing method may further include, before the extracting, detecting the occupied frequency band of the digitized analog RF signal, wherein the extracting comprises extracting at least a part of the sample data corresponding to the detected occupied frequency band.

According to an exemplary embodiment, the extracting may include extracting at least a part of the sample data corresponding to the occupied frequency band from the digitized analog RF signal based on occupied frequency band information received from an external management device communicatively coupled to the node unit.

According to an exemplary embodiment, the extracting may include extracting at least a part of the sample data corresponding to the occupied frequency band by filtering the digitized analog RF signal.

According to an exemplary embodiment, the combining may include combining the extracted sample data intactly.

According to an exemplary embodiment, the combining may include converting a frequency of at least a part of the extracted sample data; and combining the frequency-converted sample data.

According to an exemplary embodiment, the signal processing method may further include, after the combining, resampling the combined sample data.

According to an exemplary embodiment, the signal processing method may further include, after the combining, bit-compressing the combined sample data.

According to an exemplary embodiment, the signal processing method may further include, after the combining, dynamically allocating the combined sample data to a transmission frame.

According to an exemplary embodiment, the signal processing method may further include, after the allocating, converting the sample data allocated to the transmission frame into a signal corresponding to a transport medium.

According to another aspect of the inventive concept, there is provided a node unit of a distributed antenna system, includes a signal processor configured to extract at least a part of sample data corresponding to an occupied frequency band from a digitized analog radio frequency (RF) signal and to combine the extracted sample data; and a signal converter configured to convert the combined sample data into a signal corresponding to a transport medium connecting the node unit and another node unit.

According to an exemplary embodiment, the signal processor may include an extraction unit configured to extract at least a part of the sample data corresponding to the occupied frequency band from the digitized analog RF signal; and a combination unit configured to combine the extracted sample data.

According to an exemplary embodiment, the signal processor may further include a detection unit configured to detect the occupied frequency band in the digitized analog RF signal, and the extraction unit extracts at least a part of the sample data corresponding to the detected occupied frequency band.

According to an exemplary embodiment, the extraction unit may extract at least a part of the sample data corresponding to the occupied frequency band from the digitized analog RF signal based on occupied frequency band information received from an external management device communicatively coupled to the node unit.

According to an exemplary embodiment, the signal processor may further include a resampling unit configured to resample the combined sample data.

According to an exemplary embodiment, the signal processor may further include a compression unit configured to bit-compress the combined sample data.

According to an exemplary embodiment, the signal processor may further include a framer configured to dynamically allocate the combined sample data to a transmission frame.

According to an exemplary embodiment, the transport medium may be an optical transport medium, and the signal converter may convert the combined sample data into an optical signal.

According to an exemplary embodiment, the node unit may be a main unit or remote unit that constitutes the distributed antenna system.

In a node unit and a signal processing method according to embodiments of the inventive concept, a transmission capacity of signals can be reduced.

In addition, in the node unit and the signal processing method according to the embodiments of the inventive concept, costs required to implement a digital distributed antenna system can be reduced.

Furthermore, in the node unit and the signal processing method according to the embodiments of the inventive concept, a waste of resources of the digital distributed antenna system can be reduced.

BRIEF DESCRIPTION OF THE FIGURES

A brief description of the drawings is provided to more sufficiently understand the drawings recited in a detailed description of the invention.

DETAILED DESCRIPTION OF EXEMPLARY EMBODIMENTS

Figure 1:
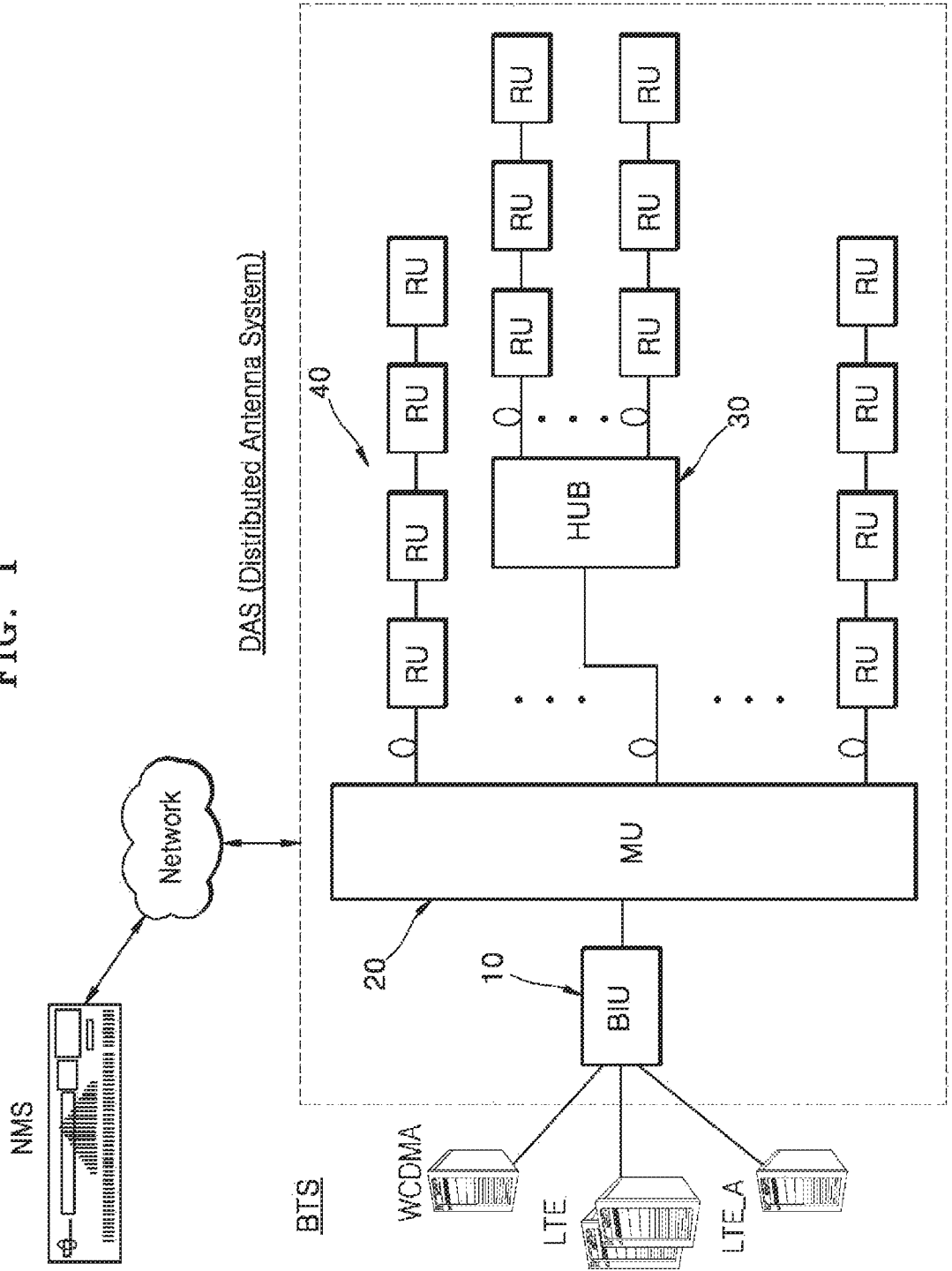
FIG. 1 is a view of an example of topology of a distributed antenna system to which the inventive concept may be applied.

As the inventive concept allows for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept.

In the description of the inventive concept, certain detailed explanations of related art are omitted when it is deemed that they may unnecessarily obscure the essence of the invention. In addition, numbers (for example, first, second, etc.) used during describing of the present specification are just identification symbols for distinguishing one component from another.

In addition, it will be understood that when an element is referred to as being "connected to" or "coupled to" another element, the element can be directly connected to or directly coupled to another element or intervening elements, unless specially otherwise defined.

In addition, the terms such as "~unit", "~or", "~er", "~module", etc., used herein represent a unit for processing at least one function or operation and may be implemented with hardware or software or a combination of the hardware and the software.

It will be clarified that classification of components in the present specification is just for classification of the components according to main functions thereof. That is, two or more components that will be described later may be combined as one component, or one component may be divided into two or more components according to subdivided functions thereof. Each of the components that will be described later may perform additionally a part or the whole of functions of another component in addition to main functions thereof, and another component may also be exclusively responsible for a part of the main functions of each component.

FIG. 1 is a view of an example of topology of a distributed antenna system to which the inventive concept may be applied.

Referring to FIG. 1, the distributed antenna system (DAS) includes a base station interface unit (BIU) 10 and a main unit (MU) 20 that constitute a headend node of the DAS, a hub unit (HUB) 30 that is an extension node, and a plurality of remote units (RUs) 40 disposed in remote service locations. The DAS may be implemented with an analog distributed antenna system or a digital distributed antenna system. In some cases, the DAS system may also be implemented with a mixed type thereof (in other words, a part of nodes performs analog processing, and the other nodes perform digital processing).

However, FIG. 1 is a view of an example of topology of the DAS, and topology of the DAS may be modified in various ways in consideration of distinct characteristics of an installation region and an applied field (for example, an in-building, a subway, a hospital, a stadium, etc.). In such a purpose, the number of BIUs 10, MUs 20, HUBs 30, and RUs 40 and a connection relationship between upper and lower stages therebetween may be different from those of FIG. 1. Also, in the DAS, the HUB 30 is utilized when the number of branches to be branched in a star topology from the MU 20 is limited compared to the number of RUs 40 required to be installed. Thus, when the number of RUs 40 required to be installed is sufficient only using a single MU 20 or a plurality of MUs 20 are installed, the HUB 30 may also be omitted.

Nodes in the DAS and functions thereof will now be described in more detail. First, the BIU 10 functions as an interface between a base station and the MU 20 within the DAS. Although FIG. 1 illustrates the case where a plurality of base stations (first through n-th base stations, where n is a natural number that is equal to or greater than 2) are connected to a single BIU 10, the BIU 10 may also be separately provided according to a service provider, a frequency band, or a sector.

In general, since radio frequency (RF) signals transmitted from the base station are signals with high power, the BIU 10 performs a function of converting the RF signals with high power into signals with appropriate power to be processed by the MU 20 and transmitting the power-controlled RF signals to the MU 20.

As illustrated in FIG. 1, when the BIU 10 reduces the high-power RF signals according to a frequency band (or a service provider, a sector) into low-power RF signals and then transmits the low-power RF signals to the MU 20 in a parallel manner, the MU 20 performs a function of combining the low-power RF signals and distributing the combined signals into the RUs 40. In this case, when the DAS is implemented with a digital distributed antenna system, the BIU 10 may digitize the low-power RF signals and may transmit the digitized RF signals to the MU 20 in a parallel manner, and the MU 20 may combine the digitized low-power RF signals, may perform predetermined signal processing on the combined signals and then may distribute the signal-processed signals into the RUs 40. Alternatively, the MU 20 may digitize the low-power RF signals transmitted from the BIU 10 and then may combine the digitized signals, may perform predetermined signal processing on the combined signals and then may distribute the signal-processed signals into the RUs 40.

According to an implementation method, unlike in FIG. 1, the BIU 10 may combine the RF signals according to a frequency band (or a service provider, a sector) and then may transmit the combined RF signals to the MU 20, and the MU 20 may distribute the combined signals into the RUs 40. In this case, when the DAS is implemented with a digital distributed antenna system, the BIU 10 may include a unit for converting high-power RF signals into low-power RF signals, and a unit for converting the low-power RF signals into intermediate frequency (IF) signals, performing digital signal processing on the IF signals and then combining the processed signals. Unlike this, when the DAS is implemented with an analog distributed antenna system, the BIU 10 may include a unit for performing a function of reducing high-power RF signals into low-power RF signals, and a unit for combining the low-power RF signals.

Each of the RUs 40 may separate the transmitted combined signals according to a frequency band and may perform signal processing such as amplification (in case of an analog distributed antenna system, analog signal processing, and in case of a digital distributed antenna system, digital signal processing) on the signals. Thus, each RU 40 may transmit base station signals to a user terminal within its service coverage via a service antenna (not shown).

Meanwhile, in FIG. 1, the BTS and the BIU 10, and the BIU 10 and the MU 20 are respectively connected to each other via a RF cable, and from the MU 20 to a lower stage thereof is connected to each other via an optical cable. However, a signal transport medium between nodes may be modified in various ways.

In an example, the BIU 10 and the MU 20 may be connected to each other via the RF cable or may also be connected to each other via the optical cable or the digital interface. In another example, at least one of the MU 20 and the HUB 30, the MU and a part of the RU 40, and the HU 30 and another part of the RU 40 may be connected to each other via the RF cable, a twisted cable, or an unshielded twisted pair (UTP) cable as well as the optical cable.

However, hereinafter, this will be described based on FIG. 1. Thus, in the current embodiment, all of the MU 20, the HUB 30, and the RU 40 may include an optical transceiver module for transmitting/receiving optical signals through electro-optic/optic-electro conversion, and when nodes are connected via a single optical cable, all of the MU 20, the HUB 30, and the RU 40 may include a wavelength division multiplexing (WDN) element.

Such a DAS may be connected to an external management device (not shown), i.e., a network management server or system (NMS) via a network. Thus, a manager may remotely monitor a state and a problem of each node of the DAS via the NMS and may remotely control an operation of each node.

The node unit according to embodiments of the inventive concept may correspond to the MU 20, the HUB 30, and the RUs 40 that perform digital signal processing.

Figure 2:
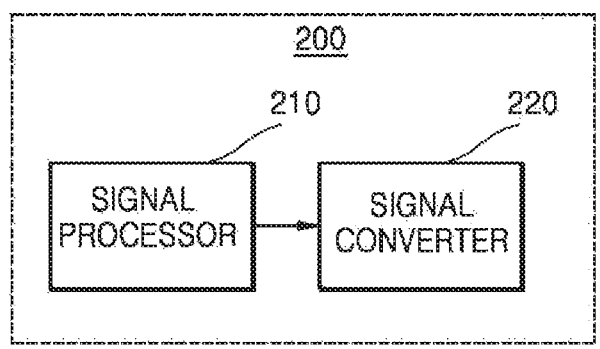
FIG. 2 is a block diagram of a part of a configuration of a node unit according to an embodiment of the inventive concept.
Figure 3:
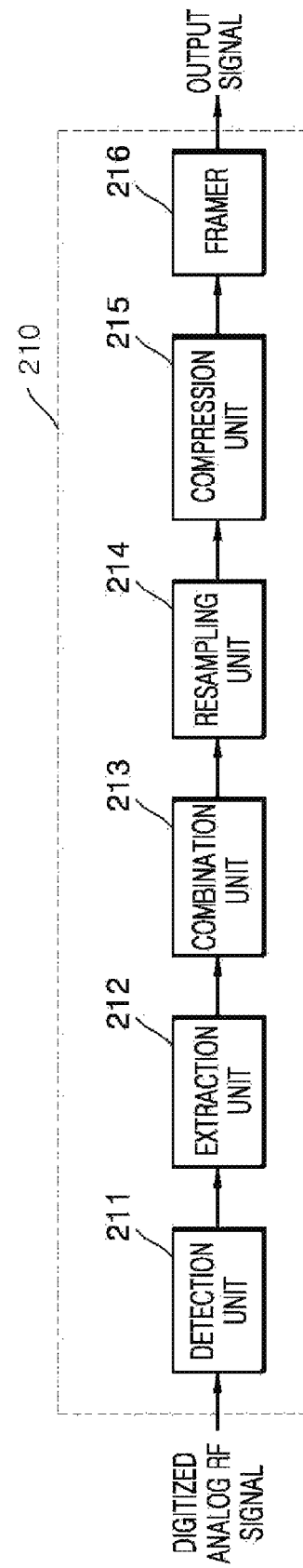
FIG. 3 is a block diagram of a part of a configuration of a signal processor illustrated in FIG. 2.

FIG. 2 is a block diagram of a configuration of a part of a node unit 200 according to an embodiment of the inventive concept, FIG. 3 is a block diagram of a part of a configuration of a signal processor illustrated in FIG. 2, and FIGS. 4 through 7 are exemplary views for describing signal processing operations performed by the signal processor illustrated in FIG. 2.

Referring to FIG. 2, the node unit 200 may include a signal processor 210 and a signal converter 220.

The signal processor 210 may generate output signals using digitized analog RF signals. Although not shown in FIG. 2, the node unit 200 may include an analog to digital (A/D) converter that samples analog RF signals transmitted from a base station or terminal and having at least one frequency band signal to generate the digitized analog RF signals, and the signal processor 210 may receive the digitized analog RF signals from the A/D converter. According to an embodiment, the signal processor 210 may include an A/D converter, and the A/D converter may sample the analog RF signals to generate the digitized analog RF signals.

The signal processor 210 may perform predetermined signal processing on the digitized analog RF signals to generate the output signals.

The signal processor 210 may be implemented with a field programmable gate array (FPGA), an application specific integrated circuit (ASIC), or a digital signal processing (DSP) board, for example.

Referring further to FIG. 3, the signal processor 210 may include a detection unit 211, an extraction unit 212, a combination unit 213, and a framer 216. According to an embodiment, the signal processor 210 may further include a resampling unit 214 and/or a compression unit 215. Hereinafter, for conveniences of explanation, as the case where the signal processor 210 includes the resampling unit 214 and the compression unit 215, the case where the resampling unit 214 and the compression unit 215 are disposed at a rear end of the combination unit 213 based on a signal transmission path, will be described. However, the inventive concept is not limited thereto. Of course, the resampling unit 214 may be disposed in one case among cases, such as at a front end of the detection unit 211, between the detection unit 211 and the extraction unit 212, and between the extraction unit 212 and the combination unit 213, based on the signal transmission path.

The detection unit 211 may detect an occupying frequency band (an occupied frequency band) of the entire frequency band of the digitized analog RF signals. Here, the digitized analog RF signals may include sample data corresponding to particular frequency band signals included in the analog RF signals. The detection unit 211 detects whether any frequency band of the entire frequency band of the digitized analog RF signals is being occupied, based on the sample data. The detection unit 211 may detect an occupied frequency band by detecting a bin power through frequency sweep or fast Fourier transform (FFT), or may detect the occupied frequency band through a multi-phase filter.

The extraction unit 212 may extract at least a part of the sample data corresponding to the detected occupied frequency band by the detection unit 211 from the digitized analog RF signals. However, the inventive concept is not limited thereto, and according to an embodiment, the extraction unit 212 may extract at least a part of the sample data corresponding to the occupied frequency band of the digitized analog RF signals based on information about an occupying frequency band transmitted from an external management device or another node unit (for example, occupied frequency band information). The external device may be a management device that is communicatively coupled to the node unit 200 via a wired or wireless network, like the NMS illustrated in FIG. 1. Alternatively, the external device may be a local terminal that is communicatively coupled to the node unit 200 via local area wireless communication. In this case, the above-described detection unit 211 may be omitted from the signal processor 210. Hereinafter, for conveniences of explanation, an embodiment in which the detection unit 211 is disposed in the signal processor 210, will be described.

For example, when it is detected by the detection unit 211 that a first frequency band and a second frequency band of the entire frequency band of the digitized analog RF signals are being occupied, the extraction unit 212 may extract sample data corresponding to the first and second frequency bands.

In another example, when it is detected by the detection unit 211 that first through third frequency bands of the entire frequency band of the digitized analog RF signals are being occupied, the extraction unit 212 may also extract only the sample data corresponding to two frequency bands of the first through third frequency bands.

The extraction unit 212 may include at least one of a low pass filter, a high pass filter, and a band pass filter, which extract sample data in a particular frequency band.

The combination unit 213 may combine the sample data extracted by the extraction unit 212.

In some embodiment, the combination unit 213 may combine the sample data extracted by the extraction unit 212 intactly. In another embodiment, the combination unit 213 may convert a frequency of at least a part of the sample data extracted so that the occupied frequency band corresponding to the sample data extracted by the extraction unit 212 can be reduced, and may combine the sample data having a converted frequency of at least a part thereof.

Signal processing performed by the extraction unit 212 and the combination unit 213 will be described in more detail further with reference to FIGS. 4A and 4B. Here, FIG. 4A illustrates the entire frequency band of digitized analog RF signals, and FIG. 4B illustrates an occupied frequency band.

Figure 4A:
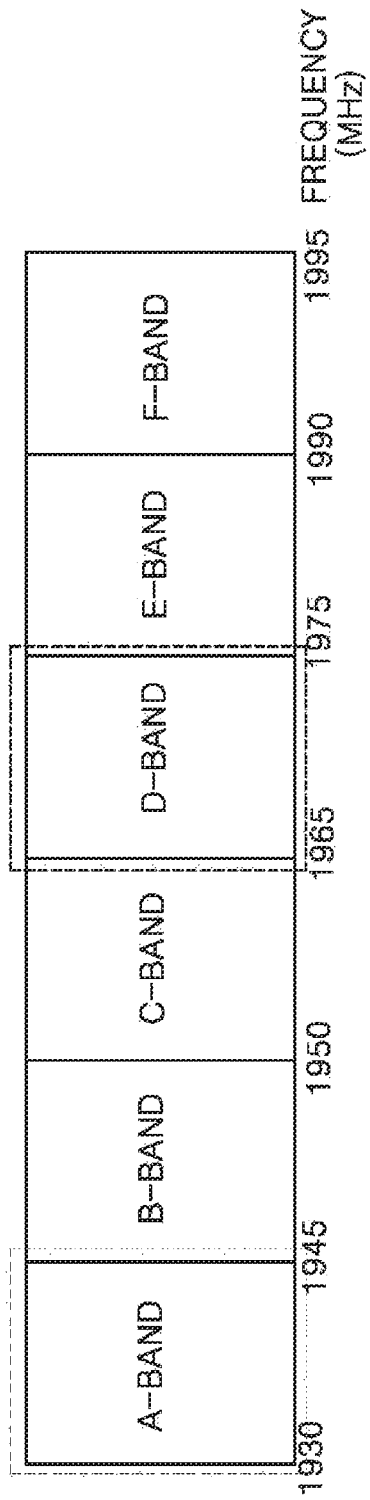
FIGS. 4A through 7 are exemplary views for describing signal processing operations performed by the signal processor illustrated in FIG. 2.
Figure 4B:
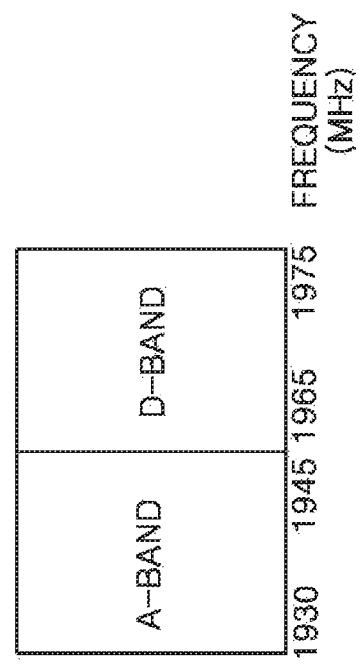

As illustrated in FIG. 4A, the digitized analog RF signals may have the entire frequency band of 1930 to 1995 MHz, and the digitized analog RF signals may occupy only a part of the entire frequency band of 1930 to 1995 MHz. For example, the digitized analog RF signals may occupy only A- and D-frequency bands.

Although the digitized analog RF signals occupy only the A- and D-frequency bands, when the node unit 200 converts the digitized analog RF signals to correspond to a predetermined transport medium, for example, an optical cable including unoccupied B-, C-, E-, and F-frequency bands and then transmits the converted digitized RF signals to another node unit, a transmission capacity may be greatly increased, and transmission resources is wasteful.

In order to prevent this problem, the extraction unit 212 of the node unit 200 may extract sample data corresponding to the A- and D-frequency bands that are actually being occupied, from the frequency band of the digitized analog RF signals.

According to an embodiment, even when the A-, D-, and E-frequency bands are occupied in the digitized analog RF signals, the extraction unit 212 may also extract only the sample data corresponding to the A- and D-frequency bands excluding the E-frequency band when a user is interested in only signals in the A- and D-frequency bands.

Subsequently, as illustrated in FIG. 4B, the combination unit 213 of the node unit 200 may combine the sample data extracted by the extraction unit 212, i.e., sample data corresponding to the A- and D-frequency bands intactly.

According to an embodiment, the combination unit 213 may convert a frequency of at least a part of the extracted sample data and may combine the sample data having a converted frequency of at least a part thereof and may output them. For example, the combination unit 213 may convert the frequency of sample data corresponding to signals that occupy the D-frequency band into 1965 to 1970 MHz and may combine the sample data with sample data corresponding to signals that occupy the A-frequency band consecutively. In another example, the combination unit 213 may convert the frequency of sample data corresponding to signals that occupy the A-frequency band into 1930 to 1945 MHz and may convert the frequency of the sample data that occupy the D-frequency band into 1965 to 1970 MHz and then may combine them consecutively. However, in this case, information about how the frequency of signals that occupy a particular frequency band is changed, may be transmitted to another node unit.

Referring back to FIG. 3, the resampling unit 214 may resample the combined sample data. The combined sample data may be obtained by resampling the digitized analog RF signals at a second sampling rate that is smaller than a first sampling rate in the A/D converter as the digitized analog RF signals are re-configured of only data corresponding to at least a part of occupied frequency bands using the extraction unit 212 and the combination unit 213, and the resampling unit 214 may down-sample the combined sample data at a third sampling rate that is smaller than the second sampling rate.

Figure 5:
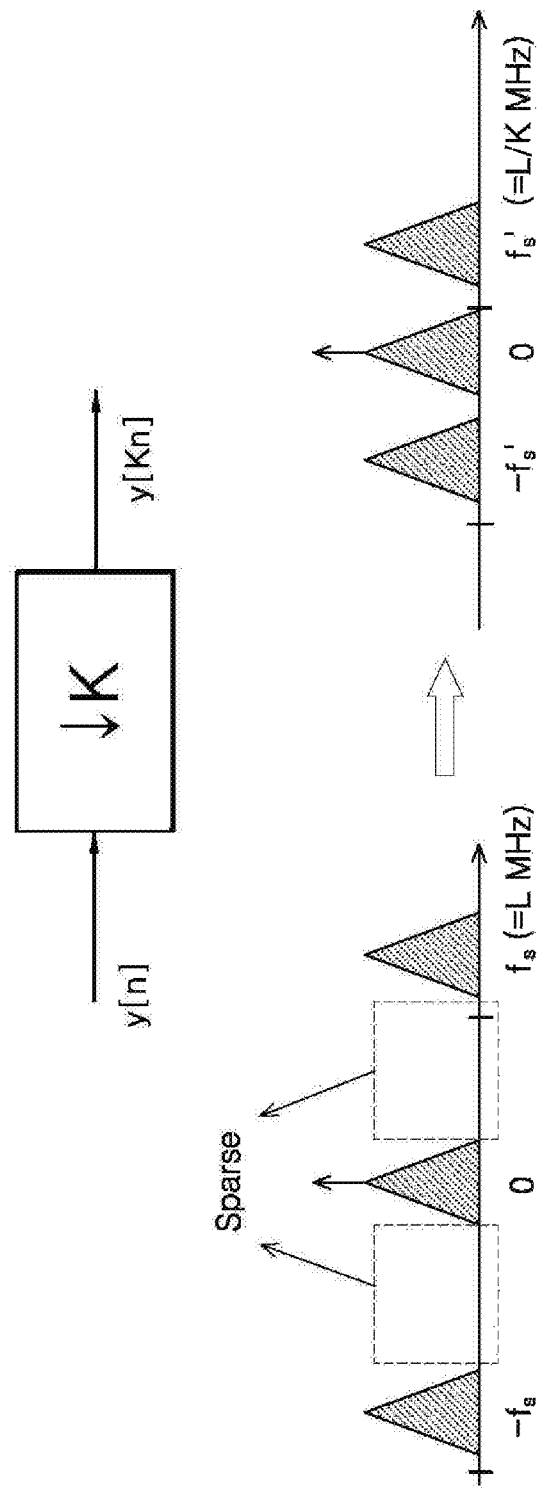

Referring further to FIG. 5, when the second sampling rate fs of the combined sample data y[n] is L Mhz, the resampling unit 214 may down sample the summed sample data at a third sampling rate fs L/K Mhz that is reduced by K-time compared to the second sampling rate and may output the down-sampled sample data y[Kn]. As the resampling unit 214 down-samples and outputs the combined sample data, a gap between frequency bands being occupied in the summed sample data may be reduced.

Figure 6:
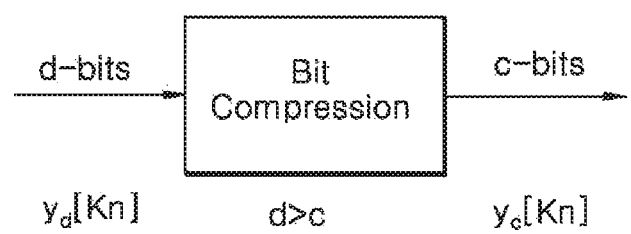

Referring back to FIG. 3, the compression unit 215 may bit-compress the output, i.e., the down-sampled sample data of the resampling unit 214. Referring further to FIG. 6, when down-sampled sample data $y_d[Kn]$ has d-bits, the compression unit 215 may bit-compress the down-sampled sample data by c-bits (where c is a natural number that is less than d) and may output the bit-compressed sample data $y_c[Kn]$. Here, the compression unit 215 may bit-compress the summed sample data using a variety of bit compression methods so that a transmission capacity of the down-sampled sample data can be reduced without any loss of the down-sampled sample data.

Figure 7:
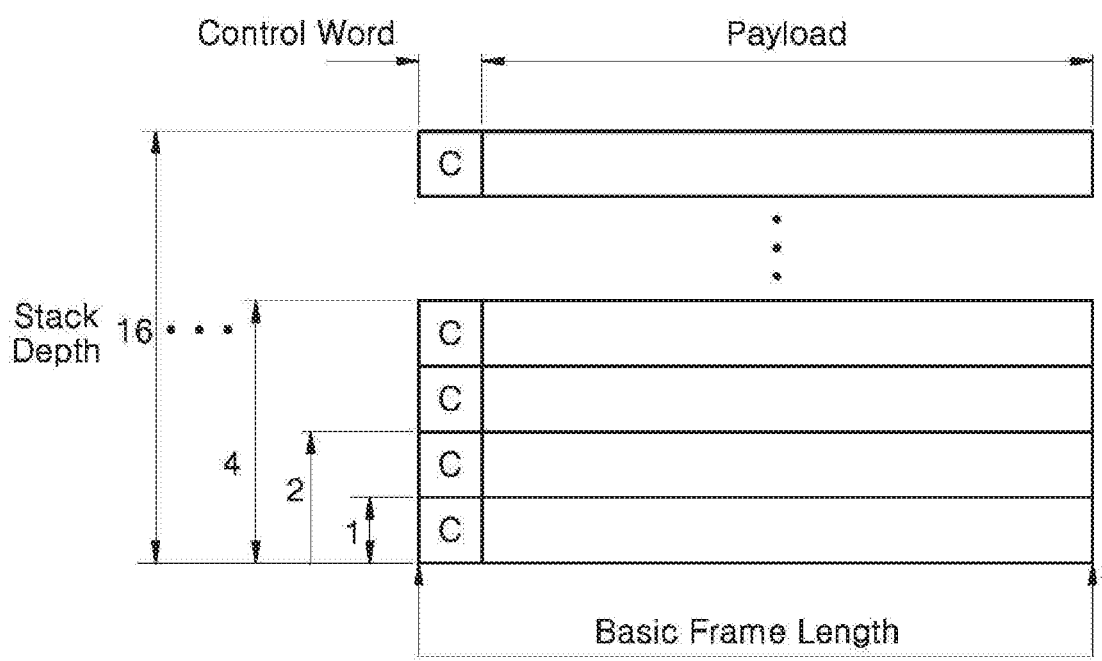

Referring back to FIG. 3, the framer 216 may dynamically allocate the output, i.e., the bit-compressed sample data of the compression unit 215 to a transmission frame and may output the output signals. Referring further to FIG. 7, the framer 216 may dynamically allocate bit-streams of the bit-compressed sample data to the transmission frame having a stackable structure (not a frame having a fixed structure) and may output the output signals having a reduced transmission capacity.

Referring back to FIG. 2, the signal converter 220 may convert the output signals output from the signal processor 210 into signals of a type corresponding to the transmission medium that connects the node unit 200 and another node unit. For example, when the transport medium is an optical cable, the signal converter 220 may convert the output signals into optical signals. In another example, when the transport medium is an unshielded twisted pair (UTP) cable, the signal converter 220 may convert the output signals into UTP signals.

The signal converter 220 may transmit the converted output signals to another node unit.

Figure 8:
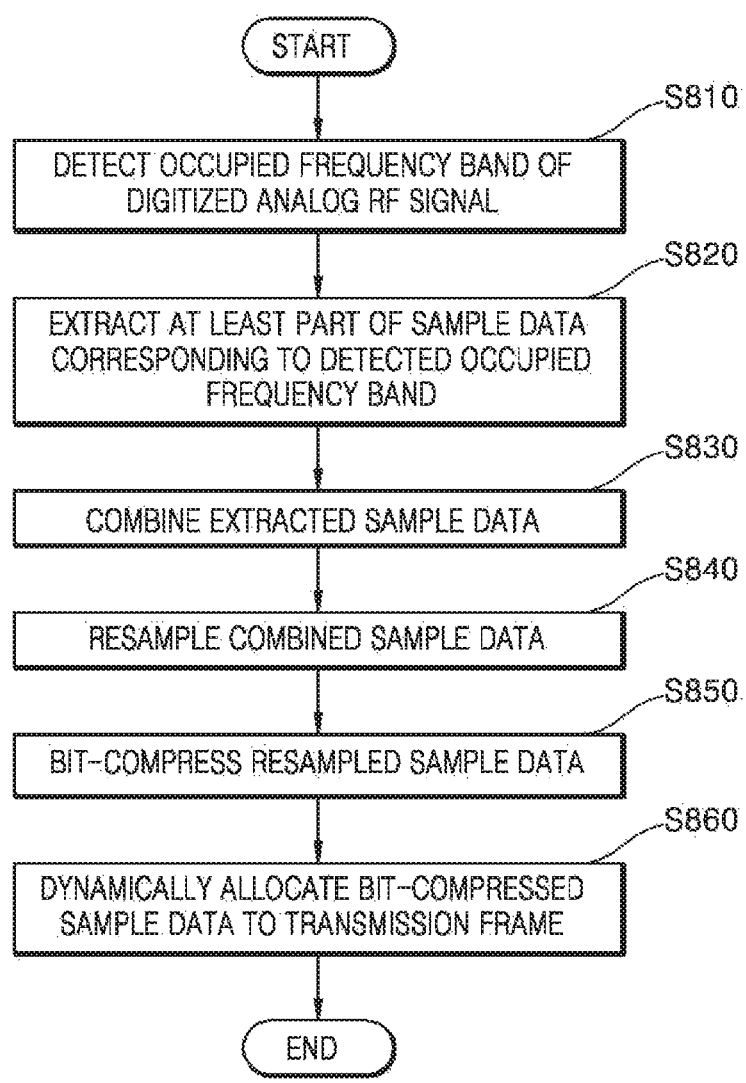
FIG. 8 is a flowchart of a signal processing method according to an embodiment of the inventive concept.

FIG. 8 is a flowchart of a signal processing method according to an embodiment of the inventive concept. Referring to FIG. 8, the signal processing method according to an embodiment of the inventive concept includes operations to be time-series performed to transmit signals from the node unit 200 illustrated in FIG. 2 to another node unit. Thus, although omitted below, the above descriptions of the node unit 200 illustrated in FIG. 2 may also apply to the signal processing method of FIG. 8.

In operation 5810, the node unit 200 may detect an occupied frequency band of digitized analog RF signals. The digitized analog RF signals may be signals obtained by sampling analog RF signals including signals having at least one frequency band at a predetermined sampling rate, and the node unit 200 may detect the occupied frequency band based on sample data corresponding to the frequency band signals included in the analog RF signals. According to an embodiment, when the node unit 200 receives occupied frequency band information transmitted from an external management device or another node unit and performs subsequent operations based on the occupied frequency band information, Operation 5810 may also be omitted.

In operation 5820, the node unit 200 may extract at least a part of the sample data corresponding to the detected occupied frequency band. According to an embodiment, the node unit 200 may extract all of the sample data corresponding to the detected occupied frequency band or may extract only a part of the sample data corresponding to the detected occupied frequency band.

In operation 5830, the node unit 200 may combine the extracted sample data. According to an embodiment, the node unit 200 may combine the extracted sample data intactly or may convert a frequency of at least a part of the extracted sample data and then may combine the sample data having a converted frequency of at least a part thereof.

In operation 5840, the node unit 200 may down sample the combined sample data.

In operation 5850, the node unit 200 may bit-compress the down-sampled sample data.

Meanwhile, operations 5840 and/or 5850 may also be omitted.

In operation 5860, the node unit 200 may dynamically allocate the bit-compressed sample data to the transmission frame.

Although not shown in FIG. 8, the node unit 200 may dynamically allocate the bit-compressed sample data to the transmission frame and then may convert the allocated, bit-compressed sample data into signals of a type corresponding to the transport medium and may transmit the signals to another node unit via the transport medium.

In the node unit 200 and the signal processing method according to embodiments of the inventive concept, a transmission capacity of signals can be reduced, and costs required to implement the distributed antenna system can be reduced. Also, in the node unit 200 and the signal processing method according to the embodiments of the inventive concept, a waste of resources of the distributed antenna system can be reduced.

While the inventive concept has been shown and described with reference to certain exemplary embodiments thereof, it will be understood by those skilled in the art that various changes in form and details may be made therein without departing from the scope of the inventive concept as defined by the appended claims.

The invention claimed is:

1. A signal processing method performed in a node unit of a distributed antenna system, comprising:
    extracting at least a part of sample data corresponding to an occupied frequency band from a digitized downlink radio frequency (RF) signal;
    converting a frequency of at least a part of the extracted sample data;
    combining the frequency-converted sample data, digitally;
    resampling the digitally combined sample data;
    dynamically allocating the resampled sample data to a transmission frame having an unfixed structure such that a length of the transmission frame is changed based on the resampled sample data; and
    converting the resampled sample data allocated to the transmission frame into a signal corresponding to a transport medium.

2. The signal processing method of claim 1, further comprising, before the extracting, detecting the occupied frequency band of the digitized downlink RF signal, wherein the extracting comprises extracting at least a part of the sample data corresponding to the detected occupied frequency band.

3. The signal processing method of claim 1, wherein the extracting comprises extracting at least a part of the sample data corresponding to the occupied frequency band from the digitized downlink RF signal based on occupied frequency band information received from an external management device communicatively coupled to the node unit.

4. The signal processing method of claim 1, wherein the extracting comprises extracting at least a part of the sample data corresponding to the occupied frequency band by filtering the digitized downlink RF signal.

5. The signal processing method of claim 1, further comprising, after the combining, bit-compressing the resampled sample data.

6. A node unit of a distributed antenna system, comprising:
    at least one signal processor configured to extract at least a part of sample data corresponding to an occupied frequency band from a digitized downlink radio frequency (RF) signal;
    convert a frequency of at least a part of the extracted sample data;
    combine the frequency-converted sample data, digitally;
    resample the digitally combined sample data;
    dynamically allocate the resampled sample data to a transmission frame having an unfixed structure such that a length of the transmission frame is changed based on the resampled sample data; and convert the resampled sample data allocated to the transmission frame into a signal corresponding to a transport medium connecting the node unit and another node unit.

7. The node unit of claim 6, wherein the signal processor further is configured to detect the occupied frequency band in the digitized downlink RF signal, and to extract at least a part of the sample data corresponding to the detected occupied frequency band.

8. The node unit of claim 6, wherein the at least one signal processor is further configured to extract at least a part of the sample data corresponding to the occupied frequency band from the digitized downlink RF signal based on occupied frequency band information received from an external management device communicatively coupled to the node unit.

9. The node unit of claim 6, wherein the at least one signal processor is further configured to bit-compress the resampled sample data.

10. The node unit of claim 6, wherein the transport medium is an optical transport medium, and the at least one signal processor is further configured to convert the resampled sample data into an optical signal.

11. The node unit of claim 6, wherein the node unit is a main unit or remote unit that constitutes the distributed antenna system.

* * * * *